Figure 1:
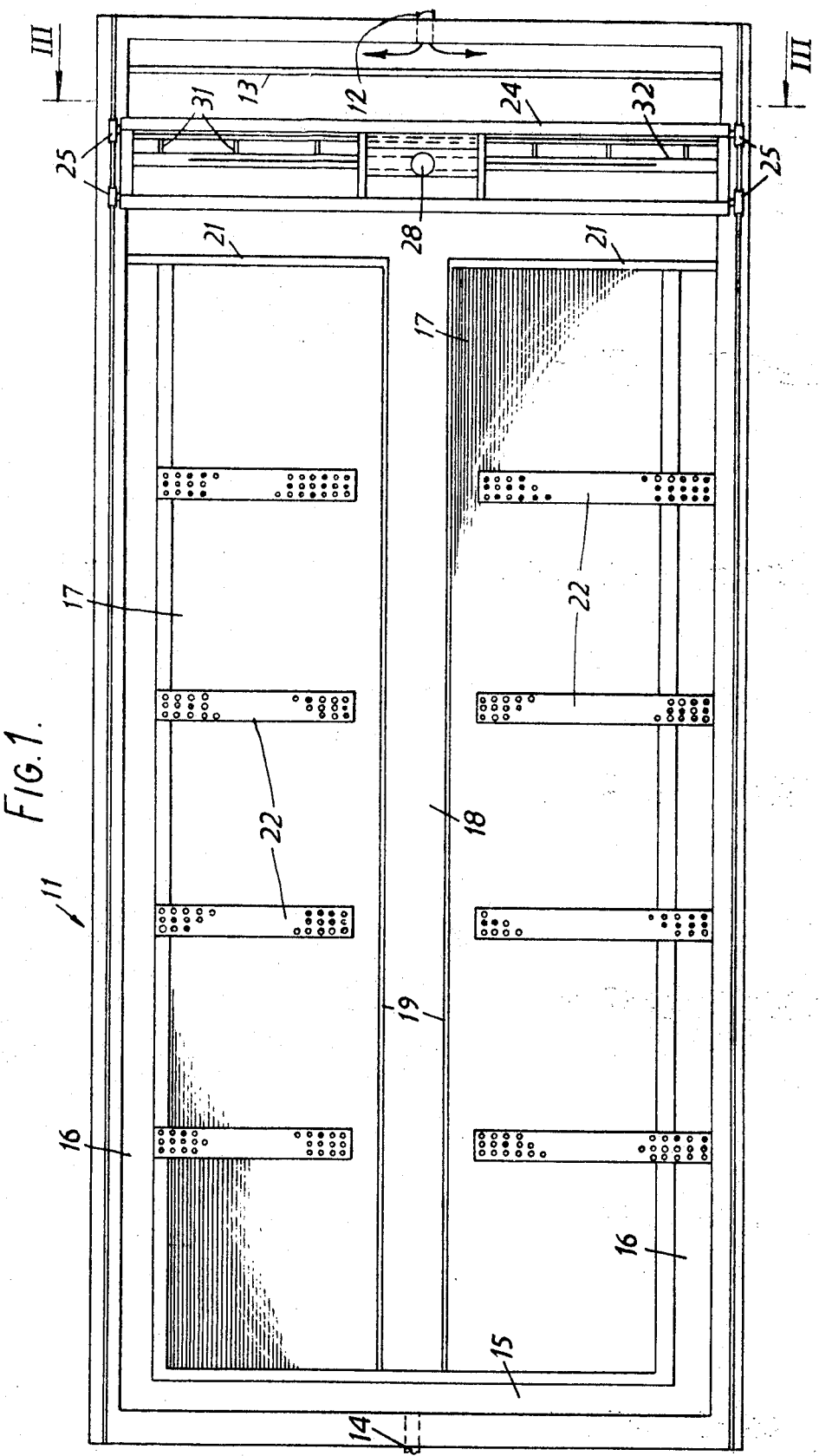

United States Patent [19]

Sparham et al.

[11] 3,774,770

[45] Nov. 27, 1973

[54] SEDIMENTATION TANKS

[75] Inventors: Vaughan Sparham, Great Budworth, Northwich; Gordon Frederick Pinner, Hitchin, both of England

[73] Assignee: British Wedge Wire Company Limited, Warrington, Lancashire, England

[22] Filed: July 12, 1971

[21] Appl. No.: 161,435

[30] Foreign Application Priority Data
July 14, 1970   Great Britain .................. 34,194/70

[52] U.S. Cl. ................................. 210/298, 210/527
[51] Int. Cl. ....................... B01d 35/16, B01d 23/02
[58] Field of Search .................... 210/298, 527, 528, 210/526, 530, 531, 311

[56] References Cited
UNITED STATES PATENTS 1,969,022   8/1934   Laughlin et al. ................. 210/298 X
2,099,654   11/1937   Lund .................................. 210/527
R21,652   12/1940   Thayer ........................... 210/528 X Primary Examiner—Frank A. Spear, Jr.
Attorney—Kemon, Palmer & Estabrook

[57] ABSTRACT

A sedimentation tank for liquid purification has a submerged horizontal filtering screen for purifying liquid passing upward through it and a scraping mechanism for scraping sludge from the bottom of the tank towards a sludge outlet. The filtering screen extends across the greater part of the interior of the tank, the zone above it being partitioned from an adjoining zone through which extends downwardly a transmission element drivably connecting the scraping mechanism to an outside power source.

3 Claims, 6 Drawing Figures

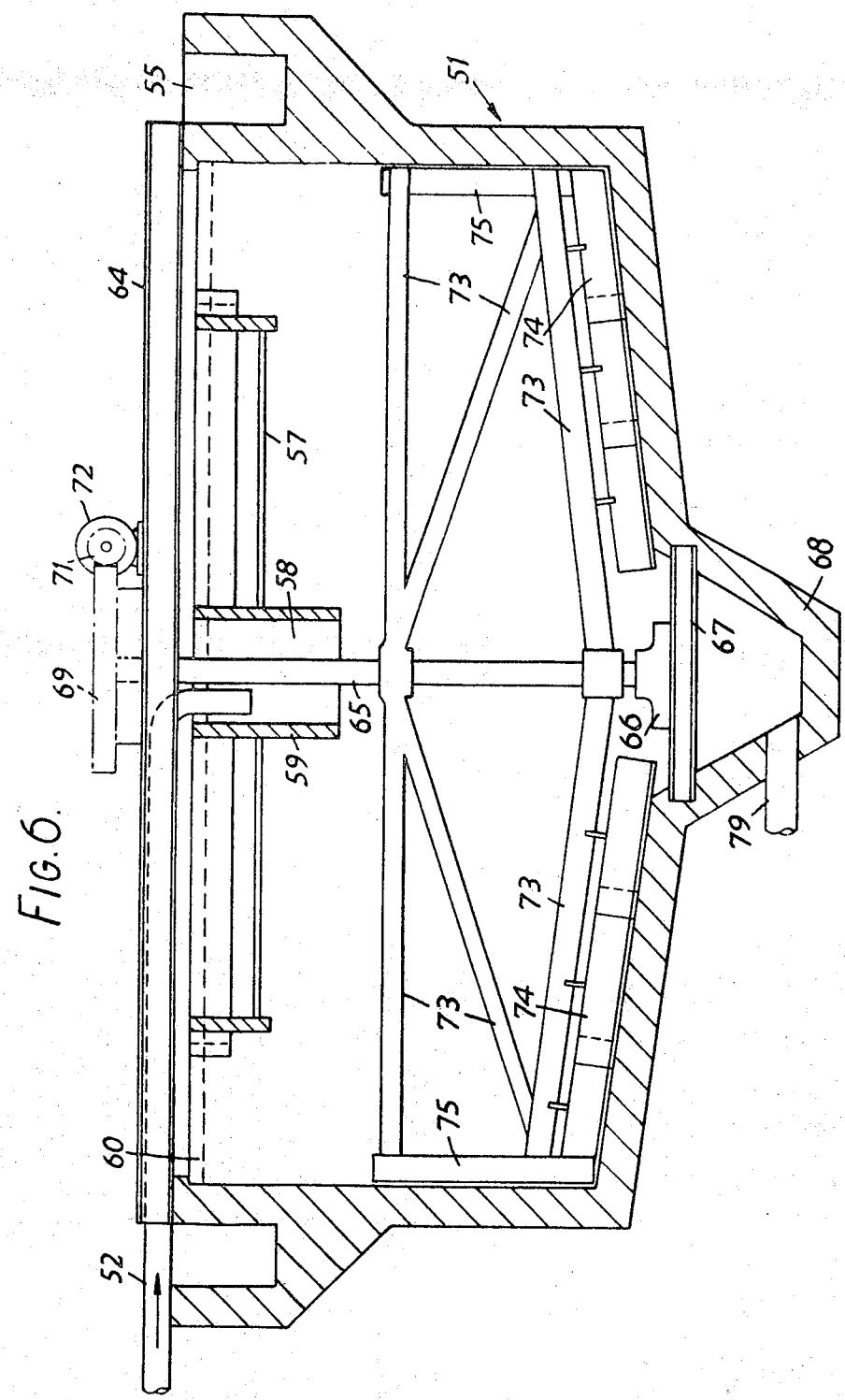

SEDIMENTATION TANKS

This invention relates to improvements in sedimentation tanks and particularly, but not exclusively, to improvements in sedimentation tanks for sewage purification.

The requirements of present day control of discharge from sewage purifications and other liquid/solid separation and water treatment plants have called for improved performance from sedimentation tanks. The achievement of better quality effluent than the Royal Commission recommendation of 30 mg/lt. suspended solids normally demands a form of tertiary treatment. Tertiary treatments can consist of a number of different processes used separately or in conjunction with one another, such as slow sand filtration, rapid gravity sand filtration, sheet flow over grassland, spray irrigation, microstraining or polishing lagoons.

The pressing demand for superior effluent quality combined with the frequent shortage of space for installations aimed at effluent polishing led to re-examination of the mechanisms of simple sedimentation, as compared with calculated performance. This in turn resulted in the development of a tertiary treatment apparatus consisting of a final sedimentation tank provided with a false floor or deck in the form of a screen composed of perforate material or of a woven or nonwoven material such as expanded metal, perforated plate or wedge wire. This false floor or deck is positioned parallel with and about 30 cms. below the top water level in the tank, baffles being provided to ensure that no water can escape from the tank without passing upwardly through this perforated or woven decking. Initially, this last-mentioned tertiary treatment apparatus was used only in conjunction with comparatively small treatment plants such as would usually be associated with populations of up to 1000 people, mainly as a result problems arising from the difficulty of access for sludge removal from sedimentation tanks provided with such a false floor or deck.

The retention of large amounts of suspended solids in the sedimentation tank in upward flow clarifiers gives rise to serious problems in relation to the removal of the resulting sludge. Hitherto, such final sedimentation tanks as have been fitted with upward flow clarifiers have not been scraped mechanically because of the access difficulty. At present, the tanks are back washed to the inlet of the works while being de-sludged by hand scraping. Power-driven chain and flight scrapers are unsuitable for the following operational reasons.

Distortion of the optimum flow pattern of the liquid to be clarified is caused by the turbulence created by the movement of the multiplicity of submerged moving parts of the chain and flight scraper. Much of the mechanism of the latter is also inaccessible for purposes of regular maintenance. There is, therefore, an urgent need for a scraping arrangement, the mechanism of which can be examined or serviced without hindrance and which can nevertheless be operated in conjunction with an upward flow clarifier element without jeopardising the quality of the effluent otherwise obtainable by the use of this type of element.

With a view to overcoming these disadvantages, there is provided according to this invention an upward flow sedimentation apparatus, comprising a. a sedimentation tank having an inlet for the admission thereinto of liquid to be clarified and an outlet for the discharge of sludge therefrom, b. a filter screen extending substantially horizontally over the greater part of the interior of the tank between a lower zone for containing liquid to be clarified received from said inlet and an upper zone for containing liquid that has been clarified by upward passage through said filter screen, c. partitioning means separating said upper zone from an adjacent upper zone which is in open communication with said lower zone, d. a collecting channel provided with an outlet and arranged to receive clarified liquid from said first-mentioned upper zone and to convey it to the outlet of the collecting channel, e. scraper means arranged for movement over the floor of the tank so as to scrape sludge therefrom towards said sludge discharge outlet, f. driving means located outside said tank, and g. power-transmission means drivably connecting said driving means to said scraper means and including a part extending downward through said adjacent upper zone into said lower zone.

This arrangement enables the following advantages to be achieved:

1. effective mechanical assistance for the removal of sludge from the sedimentation tank, despite the presence of the filtering screen, without impairing the hydraulic characteristics of the tank, 2. retention of fine particles of suspended matter such as, in prior sedimentation tanks, would have been liable to have escaped with the effluent, 3. effective removal of increased quantities of retained and settled sludge containing an unusually high proportion of colloidal fines, which fines, in the case of a tank provided with a chain and flight scraper mechanism, would have been constantly disturbed by the passage of the chains and flights through the zone where quiescent conditions are necessary in order to achieve effective settlement.

The scraper means is preferably arranged to be driven intermittently by the driving means and, whether driven intermittently or continuously, the scraping operation should take place slowly.

The sedimentation tank may be of elongated rectangular, square or circular shape in plan.

If the tank is of elongated rectangular shape in plan view, the filter screen may be subdivided into two filter screens extending from one end of the tank for the greater part of the length thereof and adjoining respectively the two longitudinal side walls of said tank, so as to leave a longitudinal gap between said two screens which, in combination with a gap at the other end of the tank, forms the said adjacent upper zone, the spaces above the two filter screens, which together form the upper zone for containing clarified liquid, being separated from the adjacent upper zone by corresponding partitions together constituting said partitioning means. In this case, the power-transmission means may include an arm supporting the scraping means at its lower end and having its upper end supported above the tank by operating means which are arranged, during each scraping cycle, first to lower the said arm to bring the scraping means into engagement with the floor of the tank, then to advance the arm through the gap between the two parts of the false floor or deck so as to scrape solids from the floor of the tank towards the outlet or outlets, next to raise the arm so as to lift the scraping means clear of the tank floor and lastly to return the raised arm and scraping means to its initial position.

If the tank is circular in plan view, the filter screen may be a single filter screen located centrally with respect to the tank and being formed with a central opening, the partitioning means projecting upwardly from the margin of said opening to enclose a circular zone constituting said adjacent upper zone, and the power-transmission means may be constituted by a rotary shaft projecting downwardly through the central opening in said filter screen and carrying scraping means including a plurality of scraper blades at its lower end.

Figure 2:
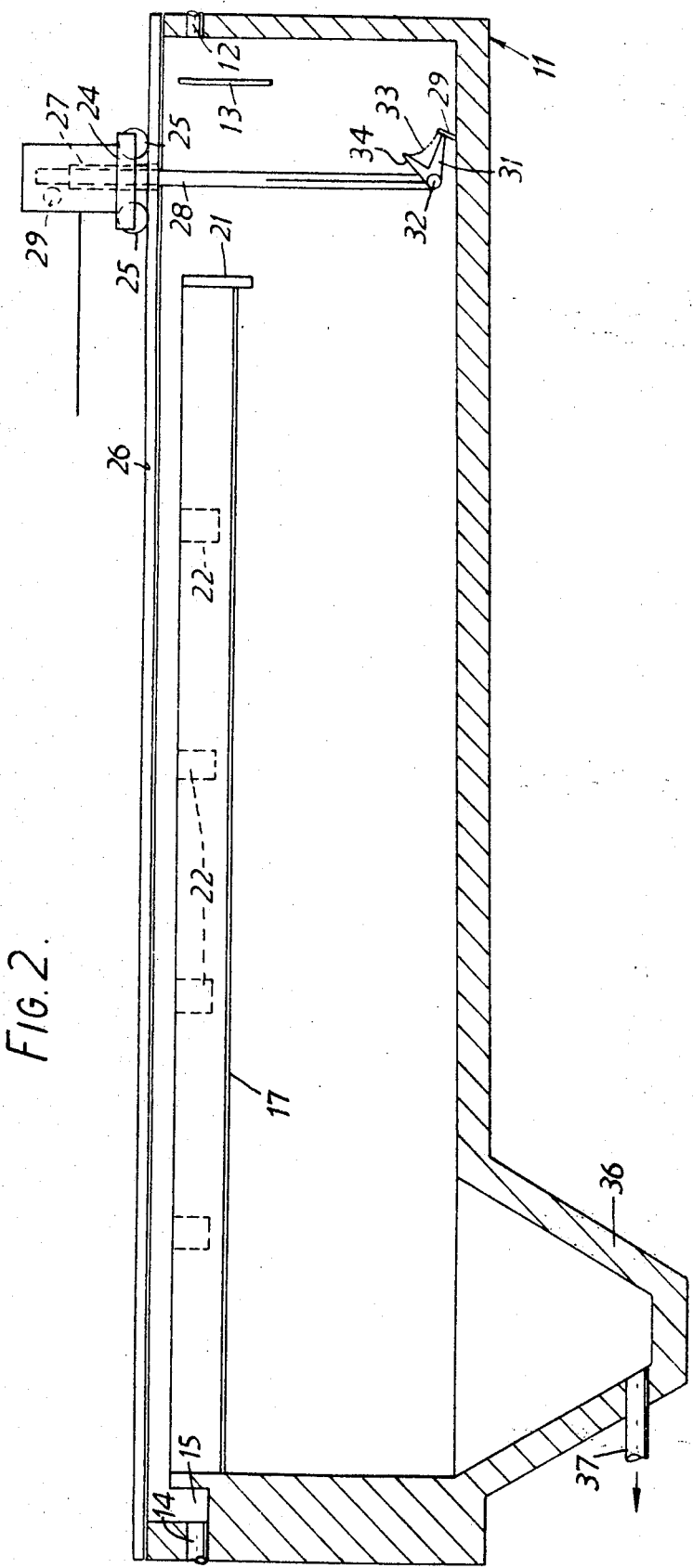
Figure 3:
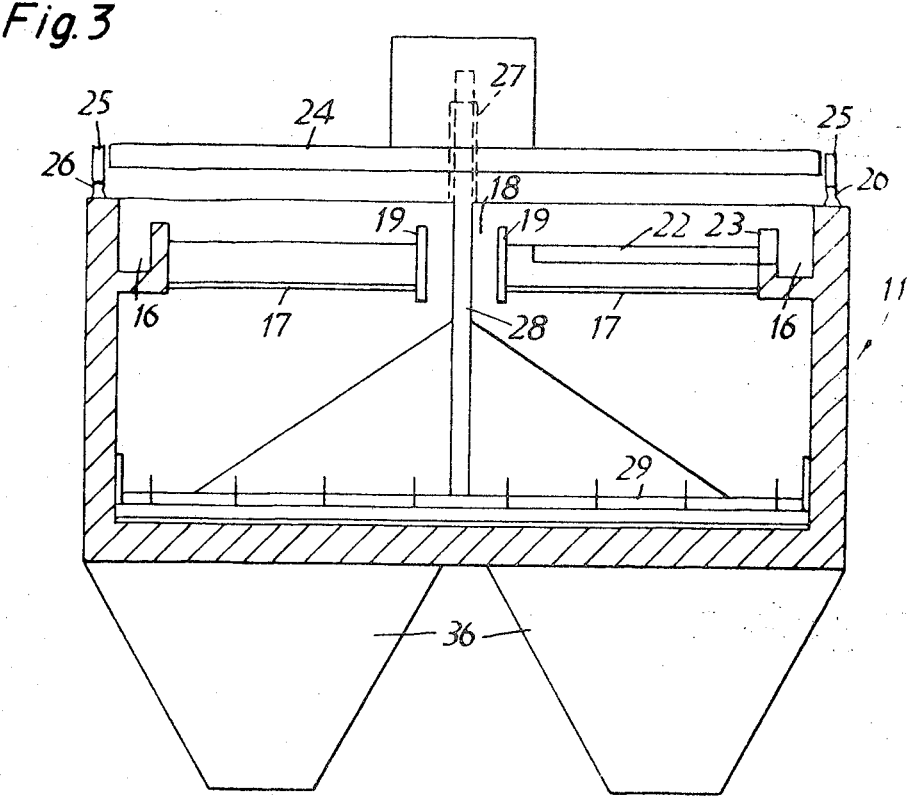
Figure 4:
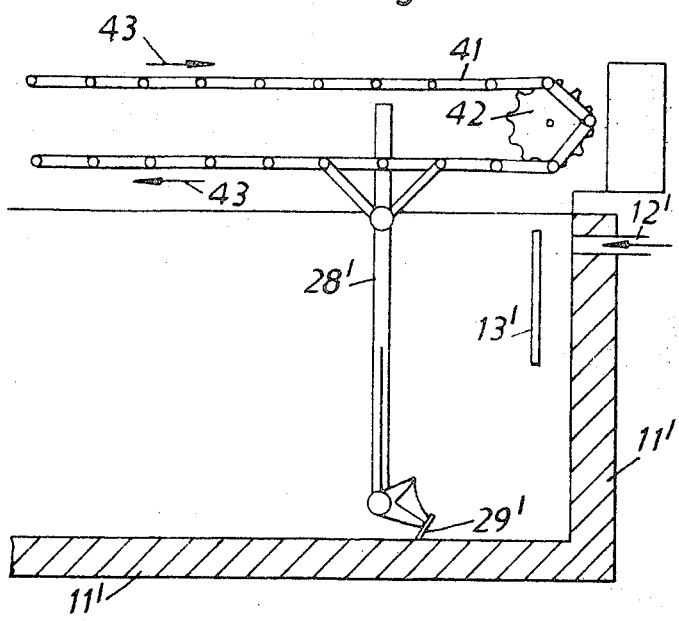
Figure 5:
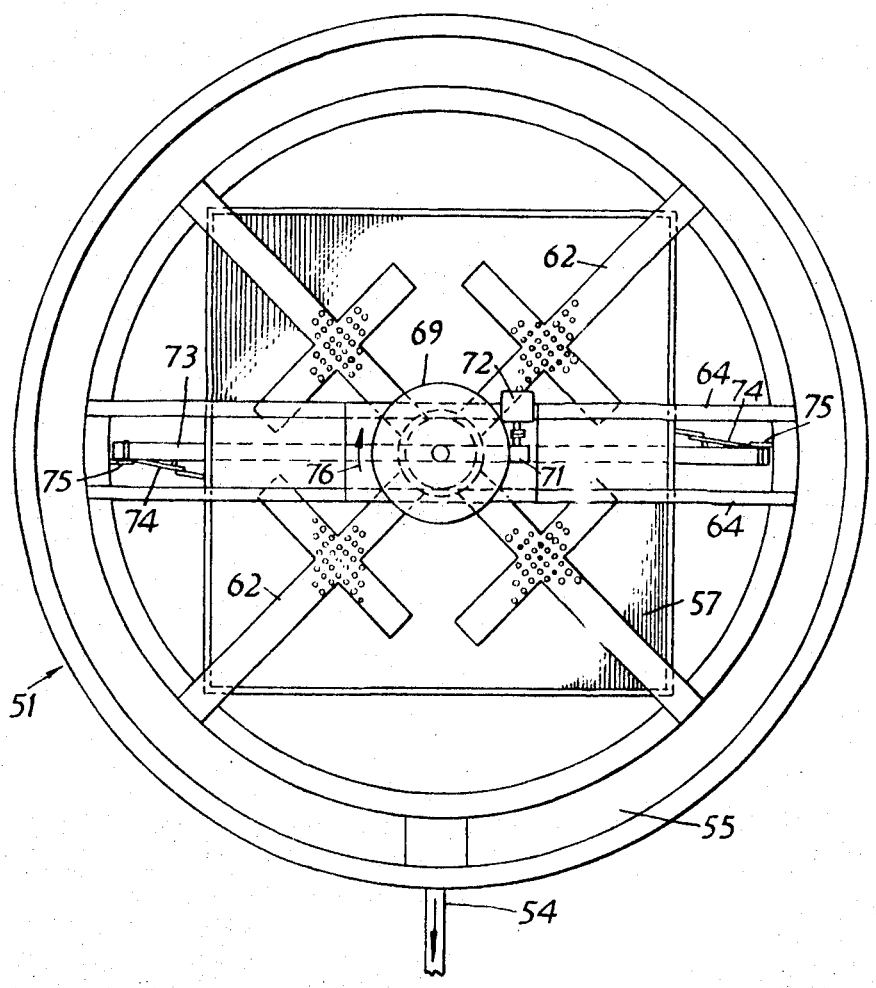

The invention will now be described by way of example with reference to the accompanying diagrammatic drawings, in which:

FIG. 1 is a plan view of a rectangular sedimentation tank provided with an upward flow clarifier and with a scraper mechanism, FIG. 2 is a vertical longitudinal section of the tank shown in FIG. 1, FIG. 3 is a section on the line III—III in FIG. 1, FIG. 4 is a fragmentary vertical longitudinal section illustrating a modification, FIG. 5 is a plan view of a circular sedimentation tank provided with an upward flow clarifier and with a scraper mechanism, an influent pipe having been omitted for the sake of simplicity, and FIG. 6 is a cross sectional view of the tank shown in FIG. 5, the influent pipe being shown.

Referring to FIGS. 1 to 3, a generally rectangular concrete tank 11 is provided at one end with an influent pipe 12 through which liquid to be clarfied with be discharged against a baffle plate 13 when the tank is in use. An effluent pipe 14 at the other end of the tank 11 is arranged to receive separated liquid effluent from a transverse channel 15 located in the upper part of the corresponding end wall of the tank and connected to longitudinal channels 16 in the upper parts of the side walls of the tank. The length of the longitudinal channels 16 in this embodiment is approximately 15 percent less than the full length of the tank 11.

Mounted respectively alongside the two longitudinal channels 16 are two horizontal, rectangular wedge-wire panels 17 separated by a longitudinal gap 18. The wedge-wire panels 17 are located at a level slightly below that of the bottoms of the channels 15, 16 and the spaces above them are isolated from the gap 18 by longitudinal vertical partition walls 19, the top edges of which are approximately level with those of the inner side walls of the channels 16, while their bottom edges project slightly below the bottom walls of these channels. Transverse partition walls 21 of similar height and depth isolate the spaces above the panels 17 from the influent end portion of the tank 11. These transverse partition walls 21 also close off the corresponding ends of the channels 16. Transversely extending perforated trays 22 extending across the spaces above the panels 17 are located at intervals along the lengths of the said spaces. The interiors of these trays communicate with the channels 16 through cut-away openings, such as 23 (FIG. 3) in the inner side walls of the channels 16.

A scraper mechanism is supported by a travelling bridge 24 having wheels 25 which are arranged to run on rails 26 on the top edges of the side walls of the tank.

In the centre of this bridge 24 is a guide 27 for a vertically slidable scraper-supporting arm 28 which can be raised and lowered by rotation of a pinion 29 meshing with rack teeth on the upper end part of the arm 28. Power-operated or hand-operated means (not shown) are provided for rotating this pinion 29 for this purpose. On the lower end of the arm 28 is mounted a transversely extending scraper device including a scraper blade 29' secured to the ends of supporting arms 31 pivoted on a transverse spindle 32. The scraper blade 29' is connected by a chain 33 to an upwardly inclined supported arm 34 which is fixedly mounted on the lower end of the arm 28. This chain 33 prevents the supporting arms 31 and scraper blade 29 from swinging down beyond bottom dead centre when the arm 28 is raised and thus ensures that the scraper will be suitably located to engage the bottom surface of the tank when the arm 28 is subsequently lowered.

The bottom of the tank 11 is provided at the effluent end thereof with two wells 36 having downwardly and upwardly inclined side and end walls. Each of these two wells 36 is provided with a large bore solids discharge pipe, one of which is shown at 37 in FIG. 2.

The operation of the tank illustrated in FIGS. 1 to 3 is as follows. Liquid to clarified introduced into the tank through the influent pipe 12 is distributed by the baffle 13. When the tank is filled to a level of a few inches below the top edges of the side walls of the trays 22, a continuous upward flow will take place through the wedge-wire panels 17 and into the trays 22, from which clarified liquid will flow through the openings 23, into the channels 16 and out through the pipe 14. While this continuous upward flow is taking place, the clarified liquid above the panels 17 will be substantially isolated from disturbances in the unclarified liquid in the gap 18 by the partition walls 19 and from that in the influent end part of the tank by the partition walls 21. Solids from the influent which are unable to pass upward through the wedge-wire panels 17 will fall onto the floor of the tank 11 from which they will be scraped at intervals into the wells 36 by the scraper mechanism. These solids will finally be flushed out at intervals from the wells through the discharge pipes 37. Each cycle of operation of the scraper mechanism is as follows. First, with the travelling bridge 24 in the position shown in FIGS. 1 and 2, the supporting arm 28 is lowered to bring the scraper blade 29 into contact with the floor of the tank 11. The travelling bridge 24 is then moved by power-driven means (not illustrated) in the direction towards the effluent end of the tank 11, so that the solids that have accumulated on the floor of the tank are displaced into the wells 36. During this movement of the travelling bridge 24 the arm 28 will move along the gap 18 between the partition walls 19. When the travelling bridge 24 reaches the end of its travel towards the effluent end of the tank 11, the pinion 29 will be rotated to raise the arm 28 and thus lift the scraper clear of the floor of the tank 11. The travelling bridge 24 will then be driven back to its starting position, i.e. its end position nearer the influent end of the tank 11. Finally, the arm 28 is lowered again in preparation for the next scraping cycle.

The rack and pinion mechanism for raising and lowering the scraper-supporting arm 28 in FIG. 1 could if desired be replaced by a hydraulic mechanism.

Although the wells 36 provided with the discharge pipes 37 are shown in FIG. 2 as being located at one end only of the tank 11, such wells could be provided at both ends, in which case the scraper could be arranged to scrape solids and sludge alternately towards one end of the tank and the other end thereof. If the tank is of substantial length, wells provided with discharge pipes may also be provided at intermediate positions along its length.

FIG. 4 illustrates a modification in which the scraper-supporting arm 28' is moved to and fro along the tank 11' by chains 41 only one of which is shown in FIG. 4 passing round chain wheels 42 and driven in the direction indicated by the arrows 43. In this case, the scraper blade 29' scrapes the floor of the tank 11' when the arm 28' is on the lower run of the chain 41 and is returned at a level substantially above the floor of the tank 11' when this arm 28' is on the upper run of the chain 41.

Referring to FIGS. 5 and 6, a generally circular tank 51 is provided with an influent pipe 52 through which liquid to be clarified will be discharged downwardly from above into the centre of the tank when the latter is in use. An effluent pipe 54 is arranged to receive separated liquid effluent from an annular channel 55 in the upper part of the outer wall of the tank 51.

A square horizontal wedge-wire panel 57 is supported in the upper part of the tank 51 at a level slightly above the bottom of the annular channel 55. In the centre of the panel 57 is an opening 58 bounded by an annular partition wall 59 which isolates the central part of the tank, into which unclarified liquid will be discharged from the influent pipe 52, from the space above the wedge-wire panel 57. The top edge of the annular partition wall 59 is above the level 60 of the surface of the liquid in the tank when the tank is full, while its lower edge is some distance below the level of the bottom of the annular channel 55. Outer partition walls 61, which have their top edges level with that of the annular partition wall 59 and their bottom edges projecting slightly below the level of the wedge-wire panel 57, isolate the space above the panel 57 from the upper layer of unclarified liquid between the outer edges of the panel 57 and the outer wall of the tank 51. Four perforated trays 62 have main portions thereof extending diagonally across the wedge-wire panel 57 as well as transverse parts extending over the panel 57 at right angles to the corresponding main parts. Imperforate outer end parts of the tray 62 projecting radially beyond the corners of the wedge-wire panel 57 extend through cut-away openings in the radially inner wall of the annular channel 55 so as to connect the interiors of the trays 62 to the said channel 55.

A bridge 64 carries an upper bearing (not shown) for a rotary shaft 65, the lower end of which is mounted in a bearing 66 carried by a support 67 extending across a well 68 in the bottom central part of the floor of the tank 51. Fixed on the upper end of the shaft 65 is a worm wheel 69 meshing with a worm 71 driven by an electric motor 72.

On the lower end of the shaft 65 is mounted a framework 73 which carries scrapers 74 for the floor of the tank 51, which floor is frusto-Conical and slopes downwardly towards the well 68, and further scrapers 75 for the inner surface of the circumferential outer wall of the tank.

The scrapers 74 each consist of a series of overlapping scraper blades which are arranged, as shown in FIG. 5, at an inclination to the radial lines passing through their outer edges, so that, when the shaft 65 is rotated in the direction indicated by the arrow 76, the scraper blades 74 will tend to deflect solids scraped thereby from the floor of the tank inwardly towards the well 68. This action will also be assisted by the fact that the floor of the tank 51 tapers downwardly from its circumference towards its centre.

The well 68 is provided with a large bore discharge pipe 79 for the removal of solids therefrom.

In the embodiment shown in FIGS. 5 and 6, when the tank 51 is full, introduction of further liquid to be clarified through the influent pipe 52 will produce a continuous upward flow through the wedge-wire panel 57 and into the trays 62 from which the clarified liquid will be discharged into the annular channel 55 and out through the effluent pipe. Solids from the influent which are unable to pass upward through the wedge-wire panel will fall onto the floor of the tank 51. At the same time, the shaft 65, being continuously rotated by the motor 72, will cause the scrapers 74 to scrape solids from the floor of the tank into the well 68 and the scrapers 75 to scrape off the inner surface of the circumferential wall of the tank any solids that may have been deposited on them by centrifigal force caused by the stirring action of the framework 73. There will thus be a continuous transference of scraped solids into the well 68 from which they will be discharged at intervals by being flushed out through the pipe 79.

Although in the embodiment shown in FIGS. 5 and 6 the partition wall 59 is annular, it could be rectangular or square.

What we claim is:

1. An upward flow sedimentation apparatus, comprising:
   a. a sedimentation tank having an inlet for the admission thereinto of liquid to be clarified and an outlet for the discharge of sludge therefrom,
   b. a filter screen extending substantially horizontally over the greater part of the interior of the tank between a lower zone for containing liquid to be clarified received from said inlet and an upper zone for containing liquid that has been clarified by upward passage through said filter screen,
   c. partitioning means separating said upper zone from an adjacent upper zone which is in open communication with said lower zone,
   d. a collecting channel provided with an outlet and arranged to receive clarified liquid from said first-mentioned upper zone and to convey it to the outlet of the collecting channel,
   e. scraper means arranged for movement over the floor of the tank so as to scrape sludge therefrom towards said sludge discharge outlet,
   f. driving means located outside said tank,
   g. power-transmission means drivably connecting said driving means to said scraper means and including a part extending downward through said adjacent upper zone into said lower zone, and
   h. a plurality of perforated trays having outlet openings communicating with the collecting channel and being positioned at horizontally spaced intervals above said filter screen for receiving clarified liquid from the first-mentioned upper zone and conveying it to said channel.

2. An upward flow sedimentation apparatus as set forth in claim 1, wherein said scraper means includes a scraper blade secured to supporting arms that are pivotly mounted on the lower end of a scraper arm, an inclined supporting arm mounted on the lower end of said scraper arm and a member connected to said incline supporting arm and said scraper blade to limit the movement in at least one direction of the said supporting arms and said scraper blade.

3. An upward flow sedimentation apparatus as set forth in claim 1 wherein the tank is circular in plan view, the filter screen is a single rectangularly shaped filter screen located centrally with respect to the tank and being formed with a central opening, perforated trays having main portions and transverse portions positioned above said filter screen with the main portions extending diagonally across said filter screen, said main portions of said trays having outlet openings communicating with said collecting channel.

* * * * *